(No Model.) 2 Sheets—Sheet 1.
C. F. BRUSH.
SECONDARY BATTERY CHARGING.
No. 395,377. Patented Jan. 1, 1889.
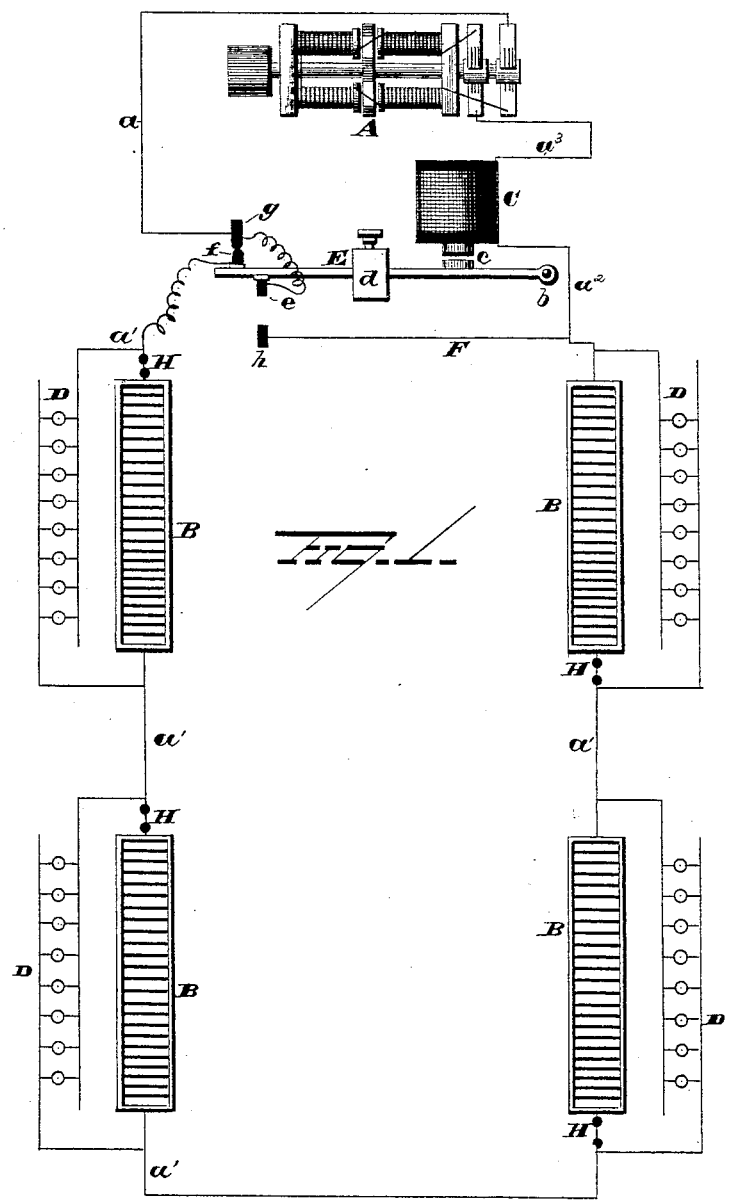
WITNESSES
E. J. Nottingham,
G. F. Downing.
INVENTOR.
Charles F. Brush.
By Burrett & Burrett,
Attorneys.

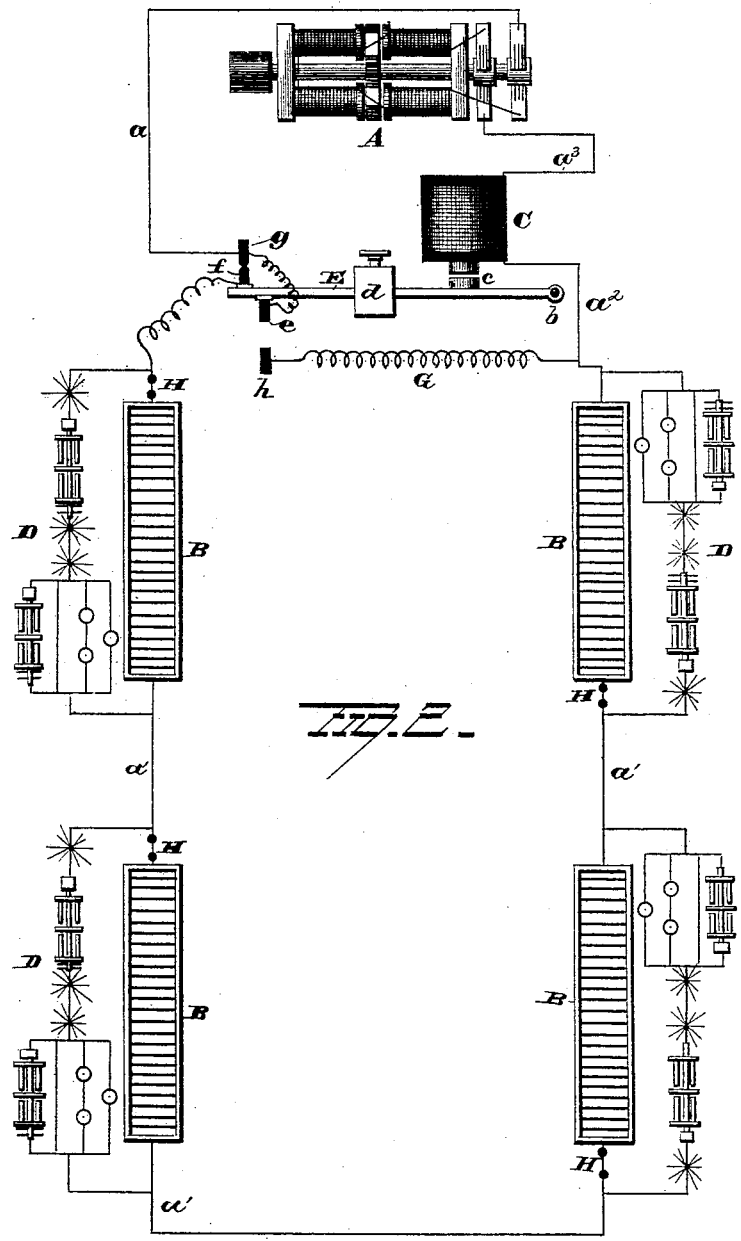

UNITED STATES PATENT OFFICE.

CHARLES F. BRUSH, OF CLEVELAND, OHIO, ASSIGNOR TO THE BRUSH ELECTRIC COMPANY, OF SAME PLACE.

SECONDARY-BATTERY CHARGING.

SPECIFICATION forming part of Letters Patent No. 395,377, dated January 1, 1889.

Original application filed June 13, 1882, Serial No. 64,033. Divided and this application filed December 11, 1883. Serial No. 114,208. (No model.) Patented in England July 1, 1882, No. 3,108; in Belgium July 22, 1882, No. 58,539; in Germany July 25, 1882, No. 24,582; in France July 26, 1882, No. 150,318; in Russia August 5, 1882, No. 5,699; in Italy September 30, 1882, No. 14,453; in Victoria November 13, 1882, No. 3,344; in Cape of Good Hope December 15, 1882, No. 11/121; in South Australia December 20, 1882, No. 318; in Spain February 1, 1883, No. 3,478; in Austria-Hungary April 15, 1883, No. 3,604; in Portugal May 2, 1883, No. 841; in India May 8, 1883, No. 170/82, and in New South Wales June 27, 1883, No. 1,262.

*To all whom it may concern:*

Be it known that I, CHARLES F. BRUSH, of Cleveland, in the county of Cuyahoga and State of Ohio, have invented certain new and useful Improvements in Secondary-Battery Charging; and I do hereby declare the following to be a full, clear, and exact description of the invention, such as will enable others skilled in the art to which it appertains to make and use the same.

My invention relates to the distribution and automatic manipulation of the current employed in charging secondary batteries or apparatus for the storage of electrical energy; and it consists in the combination, with an electric generator, a main or charging circuit, and two or more secondary batteries connected or associated with the main or charging circuit in series, of devices actuated and controlled by the current for automatically switching all of the batteries of the series into the charging-circuit.

The invention further consists in the combination, with an electric generator, a main or charging circuit, and two or more secondary batteries connected or associated with the main or charging circuit in "series," of devices actuated and controlled by the current for automatically and simultaneously switching all of the batteries of the series out of the charging-circuit when the charging-current stops or has become sufficiently reduced.

The invention further consists in certain other features of improvement in the arrangement and combination of parts in a system for charging secondary batteries, as will hereinafter be described, and pointed out in the claims.

In the accompanying drawings, Figure 1 illustrates one embodiment of my invention, and Fig. 2 represents the same with a resistance in the circuit around the batteries.

A represents a current-generator, which may consist of a dynamo or magneto-electric machine or thermo-electric or other apparatus capable of furnishing an electric current.

B represents secondary batteries, of any approved type or construction, connected or associated with the main or charging circuit in series.

C is an electro-magnet, located in the circuit $a\ a'\ a^2\ a^3$, connecting the generator and including two or more secondary batteries, B, in series.

D represents a number of electric lamps, either arc or incandescent, or other translating devices—such as motors or other devices.

E represents a lever pivoted at $b$ and provided with an armature, $c$, facing the pole or poles of the magnet C. The lever E may be provided with an adjustable weight, $d$. The free end of the lever carries contact-points $e\ f$, which are insulated from each other.

To the charging-circuit $a$ is electrically connected a stationary contact-point, $g$, which makes contact with $f$ and serves as a stop to the lever E when the latter rises in obedience to the attraction of the magnet C. Contact $e$ is electrically connected with the charging-circuit by means of a suitable flexible connection, as shown. Contact $f$ is also connected by a flexible conductor with the section $a'$ of the charging-circuit. A conductor, F, of low resistance, is electrically connected at one end with the section $a^2$ of the charging-circuit, and at its opposite end is provided with a stationary contact-point, $h$, which makes contact with $e$ and serves as a stop to the lever E when the latter falls.

A conductor of fusible metal, H, may be employed for the purpose of opening that part of the circuit which is connected to the charging and discharging circuit by fusion, if the charging or discharging current becomes greatly abnormal in quantity from any cause.

In Fig. 1 of the drawings the lever E is shown in the position which it occupies while the generator A is charging the batteries B. The current passes from the generator through the line $a$, contacts $g\ f$, lines $a'$, conductors H, batteries B, line $a^2$, magnet C, line $a^3$, back to the generator. When the charging-current stops or becomes greatly reduced, the magnet C being no longer able to support or uphold the lever E, the latter drops, separating the contacts $g$ $f$ and making contact between $e$ and $h$. Thus the batteries are disconnected at one end from the charging-line $a$ and the circuit of the generator is completed through other paths—viz., through the line $a$, contacts $e$ $h$, conductor F, line $a^2$, magnet C, and line $a^3$. When the charging-current is again started, the magnet C raises the lever E into the position shown, and the charging of the batteries is resumed.

The translating devices D, (shown in Fig. 1 as arranged in "multiple arc" and in "series" in Fig. 2) are operated by the discharge of the batteries B when the charging-current from the generator is not acting. If they are left in circuit while the charging-current is acting, they may be regarded as being operated wholly or in part by the charging-current direct. If they require less than the charging-current, the excess of the latter will pass through the battery, augmenting its charge. If they require more than the charging-current, the latter will be supplemented and reenforced by a discharge from the battery. Instead of using the low conductor F, the resistance G (shown in Fig. 2) may be employed and may be made adjustable, if desired. The contact-points $e, f, g,$ and $h$ are preferably made of carbon—such as is used in electric-arc lighting—so that their surfaces may not become impaired by the sparks which may occur between them. Obviously an axial magnet with movable core may be employed instead of the form shown at C. When the lever E rises, a spark or arc must form between the points $e$ and $h$ during the time the lever is moving and until contact is established between $f$ and $g$. The ultimate distance apart of $e$ and $h$ is so adjusted that the resistance to the passage of current offered by the spark or arc between these points is considerable, or even greater than that offered by the batteries B, so that when $f$ and $g$ make contact the passage of current between $e$ and $h$ ceases. When a resistance, G, is placed in the "short circuit," the points $e$ $h$ may be worked at a less separation, and the spark or arc between them greatly reduced, owing to the fact that the resistance replaces more or less of that which was in the first instance necessarily in the spark between $e$ and $h$.

From the foregoing explanation it will be observed that when the current is not acting in the charging-circuit the series of secondary batteries will be "open-circuited" or disconnected from the charging-circuit, and the latter will be "short-circuited" around all of said batteries; also, when the charging-current is established in the charging circuit or line the short circuit around the batteries will be opened and all of the batteries will be thrown or automatically switched into the charging-circuit. Again, when the charging-current stops all of the batteries will be automatically switched out of the charging-circuit and the latter short-circuited, as at first. These automatic operations prevent the inverse discharge of the batteries through the charging line or circuit when the charging-current is discontinued, prevent reversal of polarity in the dynamo-machine when such is employed for charging, and leave a closed circuit for the charging-current to re-establish itself in when recharging or continued charging of the batteries is desired.

This application is a division of my original application, designated as "Case T," filed June 13, 1882, Serial No. 64,033, and for the sake of convenience in distinguishing it from other applications is designated as "Division A of Case T."

The invention described and claimed in my original application referred to relates, broadly, to devices or mechanism for automatically controlling and manipulating the charging-current, and it is not confined to any particular arrangement or association of the batteries with respect to the charging-circuit, and I make no claim in this case to such broad subject-matter, as in this application the invention shown, described, and claimed relates to a separate and distinct improvement consisting in the relative arrangement of the batteries, charging-circuit, and an automatic switching mechanism, substantially as shown and described, and as will hereinafter be pointed out in the claims, and is not restricted to the particular construction and arrangement of parts shown and described for automatically switching or manipulating the charging-current.

The invention herein described and claimed is described but not specifically claimed in patents granted in the following foreign countries: England, No. 3,108, July 1, 1882; France, No. 150,318, July 26, 1882; Belgium, No. 58,539$^B$, July 22, 1882; Germany, No. 24,582, July 25, 1882; Italy, No. 14,453, September 30, 1882; Austria-Hungary, No. 3,604, April 15, 1883; Russia, No. 5,699, August 5, 1882; Spain, No. 3,478, February 1, 1883; Portugal, No. 841, May 2, 1883; Cape of Good Hope, No. 11/121, December 15, 1882; India, No. 170/82, May 8, 1883; New South Wales, No. 1,262, June 27, 1883; Victoria, No. 3,344, November 13, 1882; South Australia, No. 318, December 20, 1882.

Having fully described my invention, what I claim as new, and desire to secure by Letters Patent, is—

1. The combination, with an electrical generator, a main or charging circuit, and two or more secondary batteries included in the main or charging circuit in series, and a discharging or working circuit connected with each battery, of a switch constructed and arranged to switch all said batteries into the charging-circuit, and an electro-magnet included in the charging-circuit and adapted to actuate the switch and automatically and simultaneously switch all said batteries into the charging-circuit, substantially as set forth.

2. The combination, with an electrical generator, a main or charging circuit, and two or more secondary batteries included in the main or charging circuit in series, each of said batteries having a discharging or working circuit connected therewith, of a switch constructed and arranged to switch all said batteries out of the charging-circuit and an electro-magnet included in the charging-circuit and adapted to actuate the switch and automatically and simultaneously switch all said batteries out of the charging-circuit, substantially as set forth.

3. The combination, with an electrical generator, a main or charging circuit, and two or more secondary batteries included in the main or charging circuit in series, each secondary battery being provided with a discharging or working circuit, of a switch constructed and adapted to switch said batteries into and out of the charging-circuit, and a circuit around all of said batteries adapted to be opened and closed by said switch, and an electro-magnet constructed and arranged to actuate said switch and automatically and simultaneously switch said batteries and discharging-circuits out of the charging-circuit when the current stops or becomes sufficiently reduced and establish a circuit for the charging-current around all said batteries, substantially as set forth.

4. The combination, with an electrical generator, a main or charging circuit, and two or more secondary batteries included in the main or charging circuit in series, each secondary battery being provided with a discharging or working circuit, and a circuit around all said batteries adapted to be opened and closed by a switch, of a switch constructed and arranged to open and close a circuit around said batteries and an electro-magnet included in the charging-circuit and adapted to actuate said switch and automatically establish a closed circuit around said batteries and their discharging-circuits when the charging-current stops or becomes sufficiently reduced, substantially as set forth.

5. The combination, with an electrical generator, a main or charging circuit, and two or more secondary batteries included in the main or charging circuit in series, each secondary battery being provided with a discharging or working circuit, of a circuit including a resistance around all said batteries, a switch for opening and closing the resistance-circuit, and an electro-magnet constructed and arranged to actuate the switch and automatically and simultaneously switch all said batteries out of the charging-circuit and establish a circuit, including the resistance, around said batteries, substantially as set forth.

6. In a system embracing a suitable electric generator, the combination, with a main or charging circuit, two or more secondary batteries included in the main or charging circuit in series, a discharging-circuit connected with each battery, and a circuit around said batteries adapted to be opened and closed by a switch, of a switch constructed and arranged to switch all said batteries into and out of the charging-circuit and to open and close a circuit around all said batteries, and an electro-magnet included in the charging-circuit and adapted to actuate the switch and automatically and simultaneously switch all said batteries out of the charging-circuit and establish a circuit around all said batteries when the charging-current ceases or becomes sufficiently reduced, and for opening said circuit and automatically and simultaneously switching the batteries into the charging-circuit when the charging-current is re-established, substantially as set forth.

In testimony whereof I have signed this specification in the presence of two subscribing witnesses.

CHARLES F. BRUSH.

Witnesses:
   LEVERETT L. LEGGETT,
   ALBERT E. LYNCH.